United States Patent
Lam et al.

(10) Patent No.: US 7,051,323 B2
(45) Date of Patent: May 23, 2006

(54) METHOD AND APPARATUS FOR INITIALIZING ROMIZED SYSTEM CLASSES AT VIRTUAL MACHINE BUILD TIME

(75) Inventors: Ioi K. Lam, Mountain View, CA (US); Bernd J. W. Mathiske, Cupertino, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 583 days.

(21) Appl. No.: 10/267,381

(22) Filed: Oct. 8, 2002

(65) Prior Publication Data

US 2004/0068480 A1    Apr. 8, 2004

(51) Int. Cl.
*G06F 9/45*    (2006.01)

(52) U.S. Cl. .................. 717/148; 717/166; 719/332
(58) Field of Classification Search .............. 717/148, 717/166; 719/332, 315
See application file for complete search history.

(56) References Cited

U.S. PATENT DOCUMENTS

| 5,815,718 | A | * | 9/1998 | Tock | 717/166 |
| 6,061,520 | A | | 5/2000 | Yellin et al. | 395/705 |
| 6,349,344 | B1 | * | 2/2002 | Sauntry et al. | 719/332 |
| 6,658,421 | B1 | * | 12/2003 | Seshadri | 707/100 |
| 6,832,369 | B1 | * | 12/2004 | Kryka et al. | 717/140 |

FOREIGN PATENT DOCUMENTS

EP    0 810 522 A3    4/1998

OTHER PUBLICATIONS

Freund et al., A Type System for Object Initialization In the Java Bytecode Language, p. 310327.*
Deepak Mulchandani, "Java for Embedded Systems", IEEE Internet Computing, IEEE Service Center, Piscataway, NJ, US, Jun. 1998, pp. 30-39, XP002268549, ISSN: 1089-7801.
"KVM Porting Guide—KVM 1.0", Mobile Lab Homepage, Online! May 19, 2000, XP002271801, http://www.mobilelab.co.ke/table/up/data_vm/KVM-porting.pdf> chapter 6, pp. 15, 17, 57, 58 and 59.
"Personal Java 1.1 Application Environment Memory Usage Technical Note" Javasoft homepage, Online! Apr. 27, 1999 XP002271802, http://web.archive.org/web/199990427102022/ http://java.sun.com/products/personaljava/MemoryUsage.html> Section "Memory Reductions that Apply Both to Preloaded and Dynamically Loaded Classes", line 1-8.

* cited by examiner

*Primary Examiner*—Wei Y. Zhen
*Assistant Examiner*—Mulubrhan Tecklu
(74) *Attorney, Agent, or Firm*—Park, Vaughan & Fleming, LLP

(57) ABSTRACT

One embodiment of the present invention provides a system that initializes system classes for a virtual machine during build time for the virtual machine, so that portions of the system classes can be stored in Read Only Memory (ROM). During virtual machine build time, the system loads system classes for the virtual machine. Next, the system identifies which of the system classes can be initialized at build time and then initializes the identified system classes. The system then stores portions of the system classes in a ROM image, so that the portions of the system classes can be accessed from the ROM image during subsequent run-time execution of the virtual machine. In this way, this embodiment of the present invention reduces the amount of time required to initialize system classes during run-time execution of the virtual machine.

19 Claims, 3 Drawing Sheets

METHOD AND APPARATUS FOR INITIALIZING ROMIZED SYSTEM CLASSES AT VIRTUAL MACHINE BUILD TIME

BACKGROUND

1. Field of the Invention

The present invention relates to the design of virtual machines for computer systems. More specifically, the present invention relates a method and an apparatus for initializing system classes associated with a virtual machine and storing portions of the initialized system classes into a Read Only Memory (ROM) at virtual machine build time.

2. Related Art

The exponential growth of the Internet has in part been fueled by the development of computer languages, such as the JAVA™ programming language distributed by Sun Microsystems, Inc. of Santa Clara, Calif. The JAVA programming language allows an application to be compiled into a module containing platform-independent byte codes, which can be distributed across a network of many different computer systems. Any computer system possessing a corresponding platform-independent virtual machine, such as the JAVA VIRTUAL MACHINE™, is then able to execute the byte codes. In this way, a single form of an application can be easily distributed to and executed by a large number of different computing platforms.

Most virtual machines, such as the JAVA VIRTUAL MACHINE, perform references to system classes containing methods that perform system functions. These system classes are typically loaded and initialized at run time. Unfortunately, both the loading and initialization operations can require a significant amount of time, which can greatly increase the amount of time it takes to initialize a virtual machine.

In order to remedy this problem, some systems store portions of the system classes into Read-Only Memory (ROM) during build time for the virtual machine. (This process is referred to as "romization.") In this way, it is not necessary to load the system classes at run time, which reduces initialization time for the virtual machine. However, the system classes must still be initialized at run time.

Moreover, bytecodes loaded into ROM cannot be modified at runtime. Hence, it is not possible to perform a common performance improvement technique known as "byte code quickening," which modifies bytecodes to make use of resolved pointers. At run time, bytecodes within a given class frequently make references to bytecodes and fields in other classes. These inter-class references must first be resolved before the references can take place. Once a reference has been resolved, bytecodes that perform the same reference can be "quickened" by modifying them to use the resolved reference. Bytecodes cannot be modified in ROM. Hence, they cannot be quickened at run time.

What is needed is a method and an apparatus for reducing the amount of time required to initialize system classes within a virtual machine without the problems listed above.

SUMMARY

One embodiment of the present invention provides a system that initializes system classes for a virtual machine during build time for the virtual machine, so that portions of the system classes can be stored in Read Only Memory (ROM). During virtual machine build time, the system loads system classes for the virtual machine. Next, the system identifies which of the system classes can be initialized at build time and then initializes the identified system classes. The system then stores portions of the system classes in a ROM image, so that the portions of the system classes can be accessed from the ROM image during subsequent run-time execution of the virtual machine. In this way, this embodiment of the present invention reduces the amount of time required to initialize system classes during run-time execution of the virtual machine.

In a variation on this embodiment, prior to storing the portions of the system classes in the ROM, the system pre-quickens bytecodes that reference the initialized classes. This involves resolving pointers that point to the initialized classes, and then modifying byte codes that access the initialized classes to use the resolved pointers.

In a variation on this embodiment, the method is performed by the virtual machine at build time.

In a variation on this embodiment, prior to direct execution of the virtual machine at build time, the system builds the virtual machine and saves executable code for the virtual machine into a file. The system also builds the system classes, and saves the system classes to a file, so that the system classes can be accessed by the virtual machine.

In a variation on this embodiment, identifying which of the system classes can be initialized involves examining information in a configuration file indicating which of the system classes can be initialized, the information having been previously generated based on a set of rules for determining which classes can be initialized.

In a variation on this embodiment, the system removes class initialization methods from classes that have been initialized during build time, thereby reducing memory requirements for the initialized classes.

In a variation on this embodiment, the system links the ROM image into the virtual machine, so that portions of the system classes can be accessed from the ROM image during subsequent run-time execution of the virtual machine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
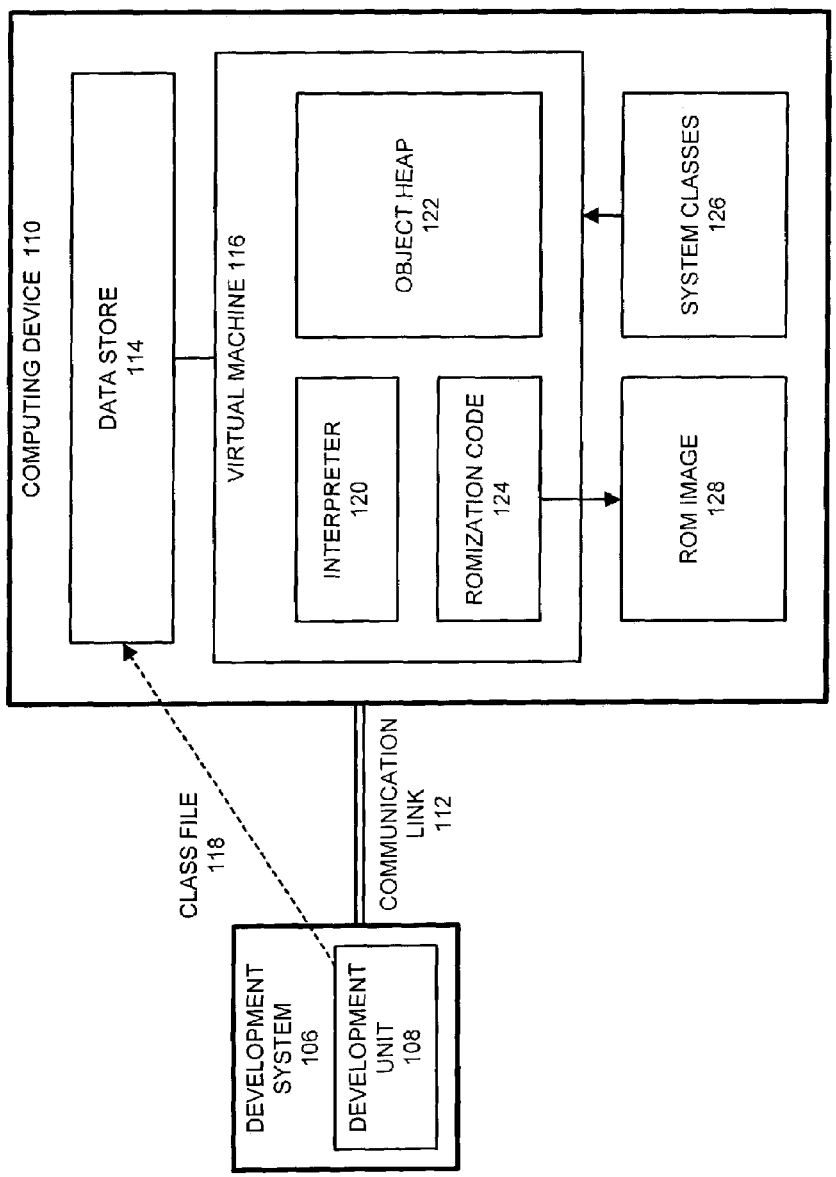
FIG. 1 illustrates a computing device in accordance with an embodiment of the present invention.

FIG. 1 illustrates a computing device 110 coupled to a development system 106 in accordance with an embodiment of the present invention. Development system 106 can generally include any type of computer system, including, but not limited to, a computer system based on a microprocessor, a mainframe computer, a digital signal processor, a portable computing device, a personal organizer, a device controller, and a computational engine within an appliance. Development system 106 contains development unit 108, which includes programming tools for developing platform-independent applications.

Development system 106 is coupled to computing device 110 through a communication link 112. Computing device 110 can include any type of computing device or system including, but not limited to, a mainframe computer system, a server computer system, a personal computer, a workstation, a laptop computer system, a pocket-sized computer system, a personal organizer and a device controller. Computing device 110 can also include a computing device that is embedded within another device, such as a pager, a cellular telephone, a television, an automobile, or an appliance.

Communication link 112 can include any type of permanent or temporary communication channel that may be used to transfer data from development system 106 to computing device 110. This can include, but is not limited to, a computer network such as an Ethernet, a wireless communication network or a telephone line.

Computing device 110 includes data store 114, for storing code and data, as well as a virtual machine 116 for processing platform-independent programs retrieved from data store 114.

During the development process, a class file 118 is created within development unit 108. Class file 118 contains components of a platform-independent program to be executed in computing device 110. For example, class file 118 may include methods and fields associated with an object-oriented class. Next, class file 118 is transferred from development unit 108 through communication link 112, into data store 114 within computing device 110. This allows virtual machine 116 to execute an application that accesses components within class file 118. Note that virtual machine 116 can generally include any type of virtual machine that is capable of executing platform-independent code, such as the JAVA VIRTUAL MACHINE developed by SUN Microsystems, Inc. of Palo Alto Calif.

Note that virtual machine 116 includes an interpreter 120, which interprets platform-independent code from data store 114 during program execution. Virtual machine 116 can alternatively execute compiled code. This compiled code is produced by compiling platform-independent code into native code for computing device 110.

Virtual machine 116 also includes an object heap 122 for storing objects that are manipulated by code executing on virtual machine 116.

During operation, virtual machine 116 accesses a-number of system classes 126, which contain methods that perform system functions. In order to speed up the initialization process, portions of virtual machine 116 and portions of system classes 126 are embedded into a ROM image 128 by romization code 124 within virtual machine 116. This romization process is described in more detail below with reference to FIGS. 2–4.

ROM vs. RAM

Figure 2:
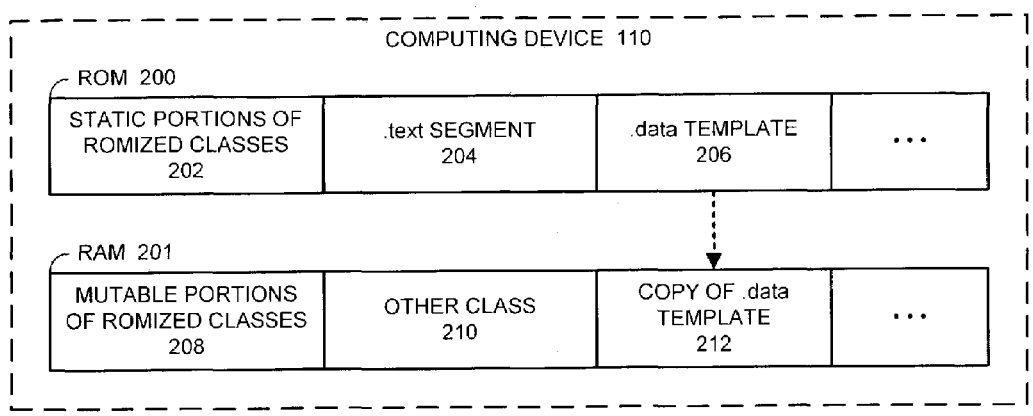
FIG. 2 illustrates items stored in ROM and RAM in accordance with an embodiment of the present invention.

FIG. 2 illustrates various items stored in ROM and RAM within computing device 110 in accordance with an embodiment of the present invention. Referring to FIG. 1, portions of virtual machine 116 and system classes 126 can be stored in Read-Only Memory (ROM) 200 at virtual machine build time. Other portions of virtual machine 116 and system classes 126 are loaded into Random Access Memory (RAM) 201 at virtual machine run time. (Note that both ROM 200 and RAM 201 are located within computing device 110.)

In general, static items that do not change at run time are stored in ROM 200. For example, referring to FIG. 2, the ".text segment" 204 and the ".data template" 206 for a JAVA VIRTUAL MACHINE can be stored in ROM 200. In contrast, mutable items that can change during run time are loaded into RAM 201.

In general, most system classes can be pre-initialized in ROM. However, it may not be possible to pre-initialize a small percentage of system classes. For example, it may not be possible to pre-initialize a system class that allocates too much memory or a system class that opens a communication session.

Static portions of the classes that can be romized 202 (and associated objects) are stored in ROM 200 during build time. For example, bytecodes for system classes and constant pool entries associated with system classes can be stored in ROM 200.

A number of items are loaded into RAM at run time. (1) Mutable portions of these romized classes 208, for example containing variables, are loaded into RAM 201 at run time. (2) Other classes (and objects) that cannot be romized 210 are also loaded into RAM 201 at run time. Additionally, (3) a copy 212 of the ".data template" 206 from ROM 200 can be stored in RAM 201 at run time.

Romization Process

Figure 3:
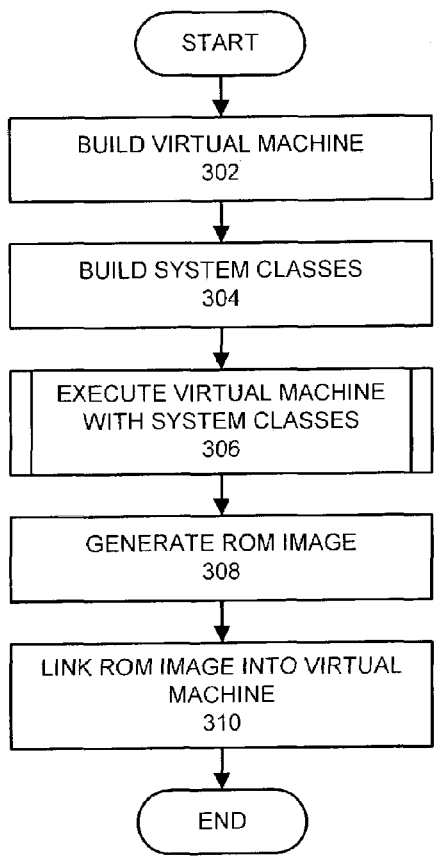
FIG. 3 is a flow chart illustrating the romization process in accordance with an embodiment of the present invention.

FIG. 3 is a flow chart illustrating the romization process in accordance with an embodiment of the present invention. This process takes place during build time for virtual machine 116. First, the system builds the virtual machine without a ROM image (step 302) and saves the executable code for the virtual machine into a file "romgen.exe." Next, the system builds the system classes (step 304) and saves them into a file "classes.zip." The system subsequently executes romgen.exe using the file classes.zip as input (step 306). During this execution process, the system generates a ROM image as is described in more detail below with reference to FIG. 4 (step 308). Next, the system links the ROM image into the virtual machine so that the ROM image can be accessed during run time execution of the virtual machine (step 310).

Note that the above-described embodiment of the present invention uses the actual virtual machine code (instead of a virtual machine simulator) to pre-initialize the system classes. This eliminates the effort and complexity involved in generating a separate virtual machine simulator to perform the pre-initialization process.

Execution of Virtual Machine at Build Time

Figure 4:
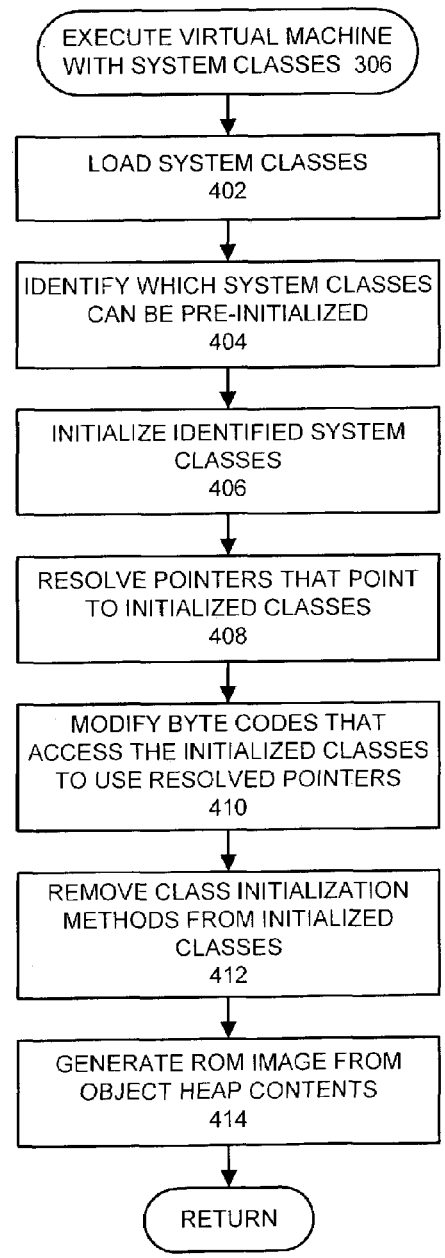
FIG. 4 is a flow chart illustrating operations performed during execution of the virtual machine at build time in accordance with an embodiment of the present invention.

FIG. 4 is a flow chart illustrating operations performed during execution of the virtual machine at build time in accordance with an embodiment of the present invention.

During execution of the virtual machine, the system runs executable code stored from the file romgen.exe. This executable code causes the virtual machine to load system classes from the file classes.zip (step 402).

Next, the system identifies which system classes can be initialized (step 404). In one embodiment of the present invention, this involves reading a configuration file indicating which classes should be initialized. This configuration file information can be generated beforehand by using a set of rules for determining whether classes can be pre-initialized. In general, most system classes can be pre-initialized. However, a small percentage of system classes, for example, a system class that allocates too much memory, cannot be initialized.

Next, the system initializes the identified classes (step 406). This can involve, for example, executing a class initialization method for each class to be pre-initialized.

At this point, the system pre-quickens byte codes in the system classes if possible. This involves resolving pointers that point to the initialized system classes from other system classes (step 408), and then modifying bytecodes in the other system classes that access these initialized classes to use the resolved pointers (step 410).

Next, the system removes class initialization methods from the initialized classes (step 412). This reduces the footprint of each initialized class and thereby reduces the footprint of the ROM image.

Finally, the system generates the ROM image from the object heap 122 contents (step 414). Note that object heap 122 contains the classes to be romized.

During subsequent execution of virtual machine 116 at run-time, when a reference is made to a given system class, virtual machine 116 first determines whether the given system class has been pre-initialized. For example, this can be determined by testing to see if the method is located in ROM, or by examining a flag associated with the method. If the class has not been pre-initialized at build time, it must first be initialized before being accessed. Otherwise, if the class has been pre-initialized at build time, it can be accessed from ROM without having to be initialized.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for initializing system classes for a virtual machine during build time for the virtual machine, so that portions of the system classes can be stored in Read Only Memory (ROM), comprising:
    loading the system classes for the virtual machine during build time for the virtual machine;
    identifying which of the system classes can be initialized at build time;
    initializing the identified system classes; and
    storing portions of the system classes in a ROM image, so that the portions of the system classes can be accessed from the ROM image during subsequent run-time execution of the virtual machine, wherein prior to storing the portions of the system classes in the ROM, the method further comprises pre-quickening bytecodes that reference the initialized classes, wherein the pre-quickening involves:
        resolving pointers that point to the initialized classes, and
        modifying byte codes that access the initialized classes to use the resolved pointers.

2. The method of claim 1, wherein the method is performed during direct execution of the virtual machine at build time.

3. The method of claim 2, wherein prior to the direct execution of the virtual machine at build time, the method further comprises:
    building the virtual machine;
    saving executable code for the virtual machine into a file to be accessed during the direct execution of the virtual machine at build time;
    building the system classes; and
    saving the system classes so that the system classes can be accessed during the direct execution the virtual machine.

4. The method of claim 1, wherein identifying which of the system classes can be initialized involves examining information in a configuration file indicating which of the system classes can be initialized, the information having been previously generated based on a set of rules for determining which classes can be initialized.

5. The method of claim 1, further comprising removing class initialization methods from classes that have been initialized during build time, thereby reducing memory requirements for the initialized classes.

6. The method of claim 1, further comprising linking the ROM image into the virtual machine, so that portions of the system classes can be accessed from the ROM image during subsequent run-time execution of the virtual machine.

7. A computer-readable storage medium storing instructions that when executed by a computer cause the computer to perform a method for initializing system classes for a virtual machine during build time for the virtual machine, so that portions of the system classes can be stored in Read Only Memory (ROM), the method comprising:
    loading the system classes for the virtual machine during build time for the virtual machine;
    identifying which of the system classes can be initialized at build time;
    initializing the identified system classes; and
    storing portions of the system classes in a ROM image, so that the portions of the system classes can be accessed from the ROM image during subsequent run-time execution of the virtual machine, wherein prior to storing the portions of the system classes in the ROM, the method further comprises pre-quickening bytecodes that reference the initialized classes, wherein the pre-quickening involves:
        resolving pointers that point to the initialized classes, and
        modifying byte codes that access the initialized classes to use the resolved pointers.

8. The computer-readable storage medium of claim 7, wherein the method is performed during direct execution of the virtual machine at build time.

9. The computer-readable storage medium of claim 8, wherein prior to the direct execution of the virtual machine at build time, the method further comprises:
    building the virtual machine;
    saving executable code for the virtual machine into a file to be accessed during the direct execution of the virtual machine at build time;
    building the system classes; and saving the system classes so that the system classes can be accessed during the direct execution the virtual machine.

10. The computer-readable storage medium of claim 7, wherein identifying which of the system classes can be initialized involves examining information in a configuration file indicating which of the system classes can be initialized, the information having been previously generated based on a set of rules for determining which classes can be initialized.

11. The computer-readable storage medium of claim 7, wherein the method further comprises removing class initialization methods from classes that have been initialized during build time, thereby reducing memory requirements for the initialized classes.

12. The computer-readable storage medium of claim 7, wherein the method further comprises linking the ROM image into the virtual machine, so that portions of the system classes can be accessed from the ROM image during subsequent run-time execution of the virtual machine.

13. An apparatus that initializes system classes for a virtual machine during build time for the virtual machine, so that portions of the system classes can be stored in Read Only Memory (ROM), comprising:
- a loading mechanism configured to load the system classes for the virtual machine during build time for the virtual machine;
- an identification mechanism configured to identify which of the system classes can be initialized at build time;
- an initialization mechanism configured to initialize the identified system classes;
- a storage mechanism configured to store portions of the system classes in a ROM image, so that the portions of the system classes can be accessed from the ROM image during subsequent run-time execution of the virtual machine; and
- a pre-quickening mechanism configured to:
  - resolve pointers that point to the initialized classes, and to
  - modify byte codes that access the initialized classes to use the resolved pointers.

14. The apparatus of claim 13, wherein the apparatus is part of the virtual machine.

15. The apparatus of claim 14, further comprising a building mechanism for a virtual machine that is configured to:
build the virtual machine; and to
save executable code for the virtual machine into a file to be accessed during the direct execution of the virtual machine at build time;
wherein the building mechanism is additionally configured to,
build the system classes, and to
save the system classes so that the system classes can be accessed during the direct execution of the virtual machine.

16. The apparatus of claim 13, wherein the identification mechanism is configured to examine information in a configuration file indicating which of the system classes can be initialized, the information having been previously generated based on a set of rules for determining which classes can be initialized.

17. The apparatus of claim 13, further comprising a removal mechanism configured to remove class initialization methods from classes that have been initialized during build time, thereby reducing memory requirements for the initialized classes.

18. The apparatus of claim 13, further comprising a linking mechanism configured to link the ROM image into the virtual machine, so that portions of the system classes can be accessed from the ROM image during subsequent run-time execution of the virtual machine.

19. A computer systen for initializing system classes for a virtual machine during build time for the virtual machine, so that portions of the system classes can be stored in Read Only Memory (ROM), comprising:
- a loading means for loading the system classes for the virtual machine during build time for the virtual machine;
- an identification means for identifying which of the system classes can be initialized at build time;
- an initializing means for initializing the identified system classes;
- a storing means for storing portions of the system classes in a ROM image, so that the portions of the system classes can be accessed from the ROM image during subsequent run-time execution of the virtual and
- a pre-quickening means for:
  - resolving pointers that point to the initialized classes, and
  - modifying byte codes that access the initialized classes to use the resolved pointers.

* * * * *

UNITED STATES PATENT AND TRADEMARK OFFICE
CERTIFICATE OF CORRECTION

| | | |
|---|---|---|
| PATENT NO. | : 7,051,323 B2 | Page 1 of 1 |
| APPLICATION NO. | : 10/267381 | |
| DATED | : May 23, 2006 | |
| INVENTOR(S) | : Ioi K. Lam et al. | |

It is certified that error appears in the above-identified patent and that said Letters Patent is hereby corrected as shown below:

In claim 19 (at column 8, line 27), delete the word, "systen" and replace with the word --system--.

In claim 19 (at column 8, line 41), delete the phrase, "virtual and" and replace with the phrase --virtual machine; and--.

Signed and Sealed this

Twenty-second Day of August, 2006

JON W. DUDAS
*Director of the United States Patent and Trademark Office*